(12) United States Patent
Reichenstein

(10) Patent No.: US 11,852,170 B2
(45) Date of Patent: Dec. 26, 2023

(54) ENERGY STORAGE SYSTEMS

(71) Applicant: Steven J. Reichenstein, Florham Park, NJ (US)

(72) Inventor: Steven J. Reichenstein, Florham Park, NJ (US)

(*) Notice: Subject to any disclaimer, the term of this patent is extended or adjusted under 35 U.S.C. 154(b) by 0 days.

(21) Appl. No.: 17/615,379

(22) PCT Filed: Jan. 24, 2020

(86) PCT No.: PCT/EP2020/051813
§ 371 (c)(1),
(2) Date: Nov. 30, 2021

(87) PCT Pub. No.: WO2020/249267
PCT Pub. Date: Dec. 17, 2020

(65) Prior Publication Data
US 2022/0228606 A1    Jul. 21, 2022

(30) Foreign Application Priority Data
Jun. 11, 2019 (GB) .................... 1908340

(51) Int. Cl.
*F17C 1/00* (2006.01)
*H02J 15/00* (2006.01)
(Continued)

(52) U.S. Cl.
CPC .............. *F15B 1/024* (2013.01); *F15B 1/027* (2013.01); *F15B 1/04* (2013.01); *F17C 1/00* (2013.01);
(Continued)

(58) Field of Classification Search
CPC .... F15B 1/04; F15B 1/086; F15B 1/16; F15B 1/165; F15B 2201/21; F15B 2201/22;
(Continued)

(56) References Cited

U.S. PATENT DOCUMENTS

| 6,513,523 B1 | 2/2003 | Izuchukwu et al. |
| 6,834,737 B2 | 12/2004 | Bloxham |

(Continued)

FOREIGN PATENT DOCUMENTS

| DE | 102020211178 A1 * | 3/2022 | ...... F15B 2201/3154 |
| GB | 786402 A * | 11/1957 | ............. F15B 1/086 |

(Continued)

OTHER PUBLICATIONS

Search Report for GB 1908340.1 dated Nov. 12, 2019.

*Primary Examiner* — Michael Leslie
(74) *Attorney, Agent, or Firm* — STANDLEY LAW GROUP LLP; Adam Smith

(57) ABSTRACT

An energy storage system is provided. The system comprises an energy storage device comprising: a pressure vessel configured to store pressurised fluid; and one or more resilient elements, wherein the resilient elements comprise a plurality of filaments of resilient material braided to form the resilient elements, wherein the resilient elements are arranged within or about the pressure vessel, and wherein the energy storage device is configured such that storing pressurised fluid within the pressure vessel acts to tension or compress the resilient elements.

15 Claims, 4 Drawing Sheets

(51) Int. Cl.
  *F15B 1/02* (2006.01)
  *F15B 1/027* (2006.01)
  *F15B 1/04* (2006.01)

(52) U.S. Cl.
  CPC ......... *H02J 15/003* (2013.01); *F15B 2201/22* (2013.01); *F15B 2201/31* (2013.01); *F15B 2211/20569* (2013.01); *F17C 2201/06* (2013.01); *F17C 2227/0157* (2013.01); *F17C 2270/0581* (2013.01)

(58) Field of Classification Search
  CPC .......... F15B 2201/31; F15B 2201/3154; F15B 2201/3156; Y02E 60/16; H02J 15/003; H02J 15/006
  See application file for complete search history.

(56) References Cited

U.S. PATENT DOCUMENTS

| | | | |
|---|---|---|---|
| 7,124,908 B2 | 10/2006 | Sanders | |
| 10,519,923 B2 * | 12/2019 | Momen | F03B 13/06 |
| 11,319,948 B2 * | 5/2022 | Sato | F04B 41/06 |
| 2004/0094557 A1 | 5/2004 | Sanders | |
| 2011/0156402 A1 * | 6/2011 | Khymych | F03D 15/10 290/55 |
| 2012/0119510 A1 * | 5/2012 | Herzen | F03D 15/10 290/55 |
| 2012/0313380 A1 | 12/2012 | Ogaz | |
| 2015/0214815 A1 | 7/2015 | VanWalleghem et al. | |
| 2016/0130986 A1 * | 5/2016 | Campos | F15B 1/024 60/416 |
| 2017/0328434 A1 | 11/2017 | Ford et al. | |

FOREIGN PATENT DOCUMENTS

| | | |
|---|---|---|
| GB | 2563207 A | 12/2018 |
| JP | H 2-188628 A | 7/1990 |
| JP | 2004-68798 A | 3/2004 |

* cited by examiner

ENERGY STORAGE SYSTEMS

TECHNICAL FIELD

The present disclosure relates to energy storage systems and is particularly, although not exclusively, concerned with energy storage systems that provide improved energy storage density.

BACKGROUND

The use of renewable energy sources, such as solar and wind energy, often results in the amount of energy being generated at a particular time differing from the amount of energy being used at that time. This can result in an energy surplus or deficit on the energy supply grid. It is therefore desirable to store excess energy, when there is a surplus on the energy grid, and to supply the stored energy back to the energy grid, when energy demand exceeds the rate of energy generation.

Further, in some situations it may be desirable for energy to be stored and/or supplied at locations that are not connected to the energy supply grid. It may therefore be desirable for a device or system for storing energy to be transportable and able to be installed in a location remote from the power generation facility or power supply grid so that energy can be stored in and/or recovered from the energy storage system or device at the remote location.

STATEMENTS OF INVENTION

According to an aspect of the present disclosure, there is provided an energy storage system comprising:
an energy storage device comprising:
  a pressure vessel configured to store pressurised fluid, e.g. at a pressure greater than the pressure outside the pressure vessel or atmospheric pressure; and
  one or more resilient elements, wherein the resilient elements comprise a plurality of filaments of resilient material twisted and/or braided to form the resilient elements, wherein the resilient elements are arranged within or about the pressure vessel, and wherein the energy storage device is configured such that storing pressurised fluid within the pressure vessel acts to tension or compress the resilient elements.

The energy storage system may comprise a compressor configured to pressurise a fluid and supply, e.g. selectively supply, the pressurised fluid to the pressure vessel.

The energy storage system may comprise a hydraulic motor in fluidic communication with the energy storage device. Alternatively, the compressor may be a combined hydraulic compressor/motor. The energy storage system may be configured such that pressurised fluid within the pressure vessel can be selectively released from the pressure vessel through the hydraulic motor, e.g. through the operation of a valve, in order to extract energy, e.g. as mechanical power, from the energy storage system. The energy storage system may further comprise a generator configured to convert the extracted energy to electrical energy.

One or more of the resilient elements may comprise spheres formed by winding, coiling and/or weaving the twisted or braided filaments of resilient material. The spheres may be arranged within the pressure vessel.

Additionally or alternatively, one or more of the resilient elements may be arranged about, e.g. wrapped around, the exterior of the pressure vessel, such that expansion of the pressure vessel due to the introduction of the pressurised fluid acts to tension the resilient elements. The resilient elements may extend around the pressure vessel in a direction with a principle component perpendicular to a longitudinal axis of the pressure vessel. For example, the pressure vessel may be substantially prism shaped, e.g. substantially cylindrical, and may define a longitudinal axis. The resilient elements may extend around the exterior of the pressure vessel in a direction with a principle component in a circumferential direction of the cylindrical shape.

The compressor and the pressure vessel may be configured such that introducing the fluid pressurised by the compressor into the pressure vessel causes a perimeter, e.g. circumference, of the pressure vessel to expand, e.g. by a predetermined expansion, thereby tensioning the resilient elements.

The energy storage device may further comprise a piston movably arranged within the pressure vessel such that an operative volume of the pressure vessel, e.g. a volume of the pressure vessel able to receive pressurised fluid from the compressor, varies as the position of the piston within the pressure vessel varies. For example, the operative volume may be a volume of the pressure vessel arranged to one side of the piston in fluidic communication with an inlet of the pressure vessel, e.g. a volume between the piston and the inlet.

One or more of the resilient elements may be arranged such that varying the position of the piston to increase the operative volume of the pressure vessel acts to tension or compress the resilient elements. For example, the one or more of the resilient elements may be elongate. First ends of the elongate resilient elements may be coupled to the piston and second ends of the elongate resilient elements may be coupled to a wall of the pressure vessel, e.g. such that varying the position of the piston to increase the operative volume of the pressure vessel acts to tension the elongate resilient elements. For example, the second ends of the elongate resilient elements may be coupled to the wall of the pressure vessel adjacent to an inlet of the pressure vessel.

The resilient material may be have a tensile strength, e.g. ultimate tensile strength, of greater than or equal to, e.g. approximately equal to, 400 MPa. The resilient material may comprise a natural or synthetic spider silk.

According to another aspect of the present disclosure, there is provided an energy storage system comprising:
a compressor configured to pressurise a fluid within the energy storage system; and
an energy storage device in fluidic communication with the compressor, the energy storage device comprising:
  a pressure vessel arranged to receive, e.g. selectively receive, the pressurised fluid from the compressor; and
  one or more resilient elements, wherein the resilient elements comprise a plurality of filaments of resilient material braided to form the resilient elements, and wherein the resilient elements are arranged within or about the pressure vessel; and
wherein the energy storage system is configured such that introduction of the pressurised fluid into the pressure vessel places the resilient elements under compression or tension.

The filament may comprise a strand or fibre of the resilient material. The resilient material may be a natural or synthetic material, such as a polymer or metal material. Two, three or more than three filaments of the resilient material may be twisted or braided to form the resilient elements.

Additionally, the twisted or braided filaments may themselves be braided, woven, coiled and/or wound to form the resilient elements.

According to another aspect of the present disclosure, there is provided an energy recovery system comprising:
an energy storage device comprising:
a pressure vessel configured to contain a pressurised fluid; and
one or more resilient elements, wherein the resilient elements comprise a plurality of filaments of resilient material twisted and/or braided to form the resilient elements, and wherein the resilient elements are arranged within or about the pressure vessel; and
wherein the energy storage system is configured such that storage of the pressurised fluid into the pressure vessel places the resilient elements under compression or tension.

According to another aspect of the present disclosure, there is provided an energy storage device for the above-mentioned energy storage system, wherein the energy storage device comprises:
a pressure vessel;
one or more resilient elements, wherein each of the resilient elements comprises a plurality of filaments of resilient material twisted or braided to form the resilient elements, wherein the resilient elements are arranged within or about the pressure vessel such that the one or more resilient elements are tensioned or compressed when pressurised fluid is introduced into the pressure vessel.

According to another aspect of the present disclosure, there is provided an energy storage method comprising:
providing an energy storage device, the energy storage device comprising:
a pressure vessel configured to store pressurised fluid; and
one or more resilient elements, wherein the resilient elements comprise a plurality of filaments of resilient material twisted and/or braided to form the resilient elements, wherein the resilient elements are arranged within or about the pressure vessel, and wherein the energy storage system is configured such that storing pressurised fluid within the pressure vessel acts to tension or compress the resilient elements; and
introducing pressurised fluid into the pressure vessel and thereby storing potential energy in the energy storage device, e.g. hydraulic potential energy and elastic potential energy.

For example, the pressure vessel may be operatively coupled to a compressor for supply pressurised fluid, and the compressor may be operated to supply pressurised fluid to the pressure vessel.

The method may further comprise transporting the energy storage device to a location at which energy is to be supplied. The method may comprise operatively coupling the pressure vessel to a hydraulic motor, e.g. at the location at which energy is to be supplied. The method may further comprise releasing the pressurised fluid through the hydraulic motor in order to convert stored energy to mechanical or electrical energy.

According to another aspect of the present disclosure, there is provided an energy supply method comprising:
providing an energy storage device, e.g. within the energy supply system. For example, providing the energy storage device may comprise operatively coupling the energy storage device to the energy supply system. The energy storage device comprises:
a pressure vessel containing a pressurised fluid; and
one or more resilient elements, wherein the resilient elements comprise a plurality of filaments of resilient material twisted and/or braided to form the resilient elements, wherein the resilient elements are arranged within or about the pressure vessel, and wherein the energy storage device is configured such that the resilient elements are placed in tension or compressor by virtue of the pressured fluid being present within the pressure vessel; and
releasing the pressurised fluid from the pressure vessel through a hydraulic motor in order to generate mechanical or electrical energy. For example, the hydraulic motor may be operatively coupled to an electrical generator configured to convert mechanical energy to electrical energy.

The pressurised fluid may be released from the pressure vessel at or below a flow rate, e.g. a predetermined flow rate, the flow rate such that a pressure of the fluid within the pressure vessel remains substantially constant, e.g. varies by less than approximately 10% or 20%, whilst the majority of the fluid is release from the pressure vessel.

A valve at an outlet of the pressure vessel may be opened to provide a predetermined flow area in order to control the flow rate of pressurised fluid leaving the pressure vessel, e.g. to maintain the flow rate at less than or equal to the predetermined flow rate.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION

Figure 1:
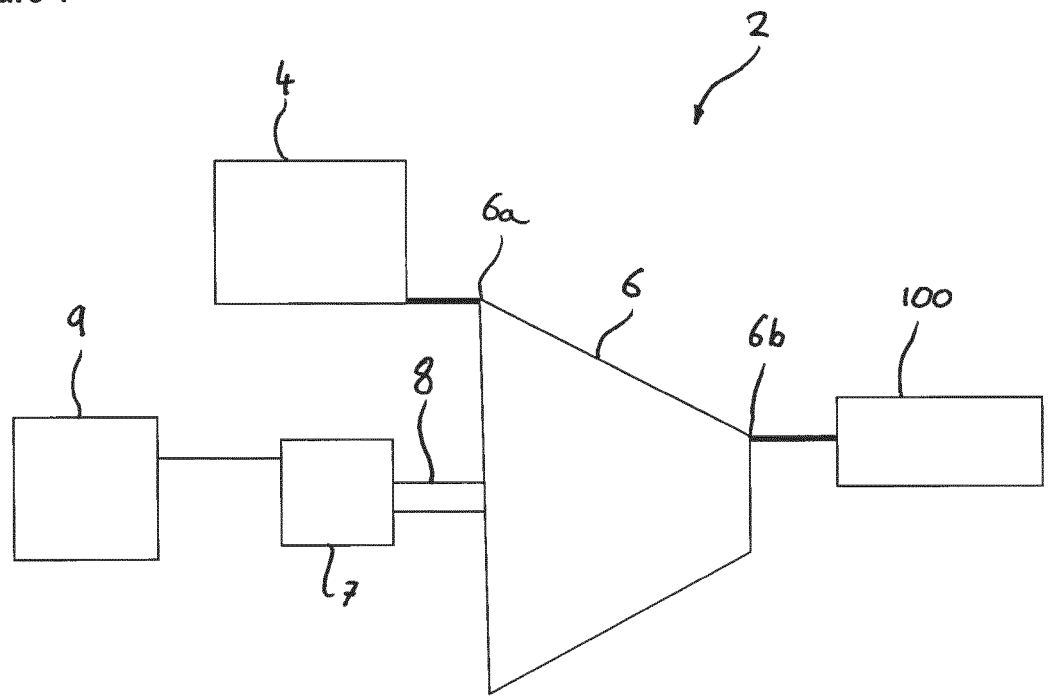
FIG. 1 is a schematic view of an energy storage system according to arrangements of the present disclosure.

With reference to FIG. 1, an energy storage system 2, according to the present disclosure, comprises an energy storage device 100. As described below, the energy storage device 100 is configured to store energy by virtue of a pressurised fluid being stored within the energy storage device 100.

The energy storage system 2 may further comprise a source of working fluid 4 and a compressor 6. The working fluid may be a substantially incompressible fluid, such as a hydraulic fluid. An inlet 6a of the compressor is fluidically coupled to the source of working fluid 4 and an outlet 6b of the compressor is fluidically couplable to the energy storage device 100. The compressor 6 is configured to draw working fluid from the source of working fluid 4, pressurise the working fluid and deliver the pressurised working fluid to the energy storage device 100 to be stored.

In the arrangement shown in FIG. 1, the compressor 6 is a rotary compressor, such as a radial flow, mixed flow or axial flow compressor, which operates to pressurise the working fluid by virtue of the rotation of a rotor of the compressor. In other arrangements, the compressor 6 may comprise a reciprocating compressor or any other form of compressor suitable for compressing fluid from the source of working fluid 4 for storage in the energy storage device 100.

A motor 7 may be operatively coupled to the compressor 6 by a shaft 8 for rotatably driving the compressor 6, in order to pressurise the working fluid. In the arrangement shown in FIG. 1, the motor 7 is an electric motor. However, in other arrangements, the motor 7 may be an internal combustion engine, or any other motor 7 for driving the compressor 6.

The energy storage system 2 further comprises a source of energy 9 for the motor 7. The source of energy 9 may comprise a connection to an electrical supply grid. Additionally or alternatively, the source of energy 9 may comprise a renewal energy source, such as a solar cell or wind turbine. In arrangements in which the motor 7 is an internal combustion engine, the source of energy 9 may comprise a fuel tank.

Figure 2:
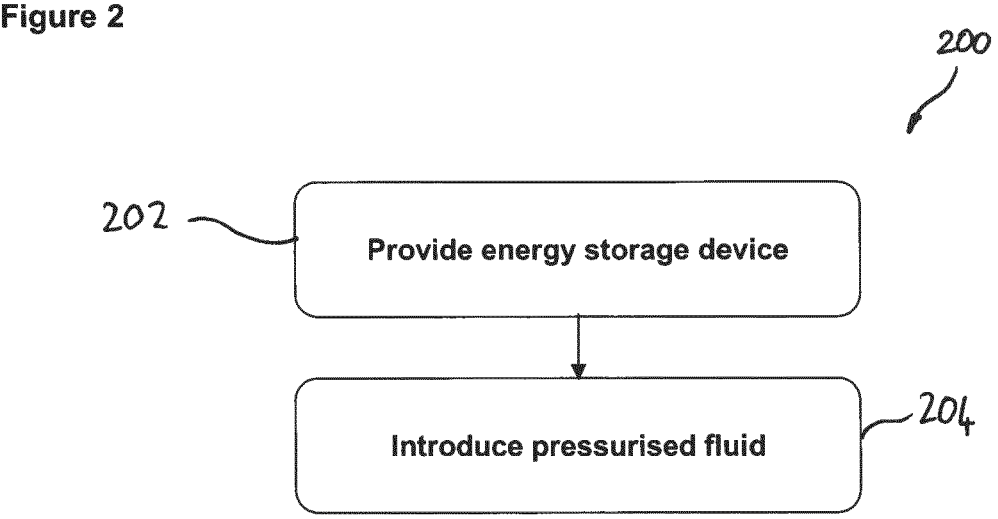
FIG. 2 is a flow chart illustrating a method of storing energy according to the present disclosure.

With reference to FIG. 2, the energy storage system 2 may be operated according to an energy storage method 200. The method 200 comprises a first step 202 in which the energy storage device 100 is provided within the energy storage system 2. In particular, the energy storage device 100 may be operatively coupled to the outlet 6b of the compressor 6.

The method 200 further comprises a second step 204 in which pressurised fluid is introduced into the energy storage device 100, thereby storing energy within the energy storage device, e.g. as hydraulic potential energy and elastic potential energy. Storage of energy by the energy storage device is described in more detail below.

In the second step 204, the motor 7 may use energy from the source of energy 9 to drive the compressor 6. The compressor 6 may draw working fluid from the source of working fluid 4, pressurise the working fluid and supply the pressurised working fluid to the energy storage device 100.

Figure 3:
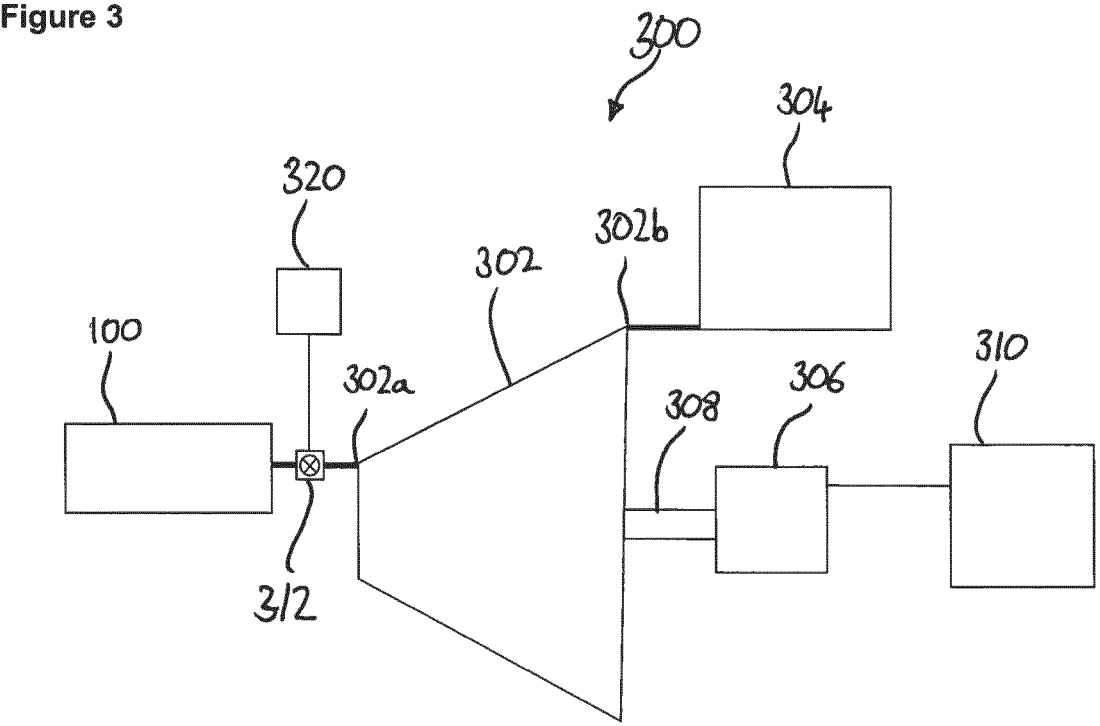
FIG. 3 is a schematic view of an energy supply system according to arrangements of the present disclosure.

After pressurised working fluid has been stored within the energy storage device 100, the energy storage device 100 may be removed from the energy storage system 2 and may be installed within an energy supply system 300, as depicted in FIG. 3. As described below, the energy supply system 300 is operable to extract stored energy from the energy storage device 100 and supply the extracted energy to energy consuming devices, e.g. local to the energy supply system 300, or an energy supply grid.

The energy supply system 300 may be remote from the location of the energy storage system 2, e.g. from one or more of the compressor 6, motor 7 and the source of energy 9 of the energy storage system. One or more components of the energy supply system 300 may be provided in a location in which it is desirable to supply the stored energy. Accordingly, the energy storage device 100 may be transported from the location of the energy storage system 2 to the location of the energy supply system 300.

Alternatively, the energy supply system 300 may be co-located with the energy storage system 2. Co-locating the energy storage and energy supply systems 2, 300 may beneficial enable the energy storage device 100 to be used to store and release energy from and to an energy supply grid, for example, in order to balance fluctuations in supply and demand of energy from the supply grid.

As depicted in FIG. 3, the energy supply system 300 comprises the energy storage device 100. The energy supply system 300 may further comprise a hydraulic motor 302 and a reservoir 304 for storing working fluid that has been passed through the hydraulic motor 302. As shown, an inlet 302a of the hydraulic motor is couplable to the energy storage device 100 and an outlet 302b of the hydraulic motor is coupled to the reservoir.

The hydraulic motor 302 my comprise any machine capable of extracting energy from the pressurised working fluid as it is passed through the hydraulic motor 302 from the energy storage device 100 to the reservoir 304, e.g. by virtue of a drop in pressure of the pressurised working fluid as it passes through the hydraulic motor 302, and converting the energy to kinetic energy of an output linkage 308, e.g. shaft, connected to the hydraulic motor.

For example, the hydraulic motor 302 may comprise a hydraulic gear motor or a hydraulic vane motor configured to extract energy from the pressurised working fluid to rotatably drive an output shaft of the hydraulic motor 302. In other arrangements, the hydraulic motor 302 may be configured to drive an oscillatory movement of the motor output linkage, or drive a linear movement, e.g. reciprocating movement, of the output linkage 308.

The energy supply system 300 may further comprise a generator 306 operatively coupled to the hydraulic motor 302, e.g. by the output linkage 308. The generator 306 may be electrically connected to an electrical load 310 to be powered by the energy supply system 300.

In other arrangements, the energy supply system 300 may be for supplying mechanical power directly to a mechanical load, such as a pump, a drill, manufacturing machinery or any other domestic or industrial machinery. The mechanical load may be configured to be driven by a shaft or linkage performing a rotatory, oscillatory or reciprocating movement. In such arrangements, the generator 306 may be omitted and the mechanical load may be driven directly by the hydraulic motor 302.

The energy supply system 300 may comprise a valve 312, e.g. arranged between the energy storage device 100 and the inlet of the hydraulic motor 302, configured to control the rate at which the pressurised working fluid is supplied form the energy storage device 100 to the hydraulic motor 302. The valve 312 may thereby control the mechanical power output by the hydraulic motor, and optionally, the electrical power produced by the generator 306 to be supplied to the electrical load 310.

The energy supply system 300 may further comprise a controller 320 configured to control the operation of the valve 312, such that a desired power is supplied to the electrical load 310 or the mechanical load. The controller 320 may be configured to determine a power demand of the electrical load 310 or the mechanical load and may control the operation of the valve 312 according to the power demand. For example, the controller 320 may be configured to determine a voltage across the electrical load 310 and may control the operation of the valve to maintain the voltage within predetermined upper and/or lower voltage limits. Alternatively, the controller 320 may be configured to determine a speed, e.g. rotational speed, of a linkage supplying mechanical power to the mechanical load and may control the operation of the valve 312 to maintain the speed within predetermined upper and/or lower speed limits.

Figure 4:
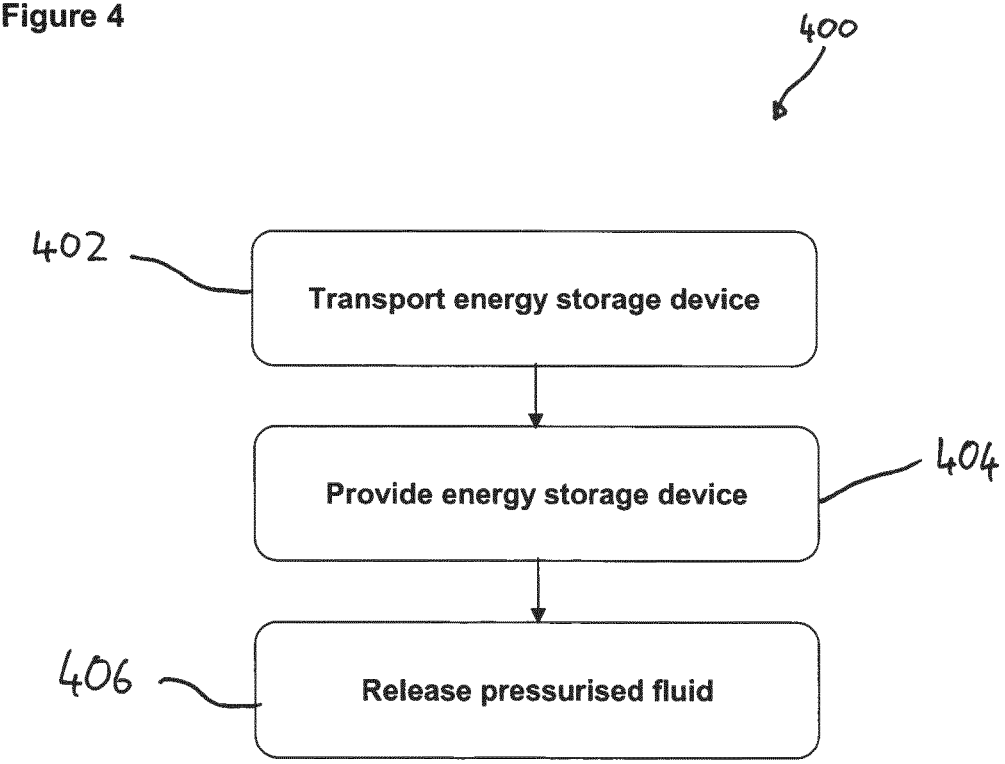
FIG. 4 is a flow chart illustrating a method of supplying energy according to the present disclosure.

With reference to FIG. 4, the energy supply system 300 may be operated according to an energy supply method 400. The method 400 may comprise a first step 402, in which the energy storage device 100 is transported, e.g. from the location of the energy storage system 2, to the location of the energy supply system 300. The method 400 comprises a second step 404, in which the energy storage device 100 is provided, e.g. within the energy supply system 300. For example, the energy storage device 100 may be operatively coupled to the inlet 302*a* of the hydraulic motor 302. The energy storage device 100 may be operatively coupled to the hydraulic motor 302 via the valve 312.

The method 400 further comprises a third step 406 in which the pressurised working fluid is released from the energy storage device 100 through the hydraulic motor 302, e.g. by opening the valve 312. As described above, releasing the pressurised working fluid through the hydraulic motor 302 generates mechanical power to be supplied to a mechanical load or electrical energy via the generator 306 for the electrical load 310 of the energy supply system 300.

In the arrangements described above, the energy storage system 2 and the energy supply system 300 are distinct systems, with only the energy storage device 100 being common between them. However, in other arrangements, one or more of the components of the energy storage system 2 and energy supply system 300 may be common to both systems. For example, the compressor 6 of the energy storage system 2 may be a hydraulic compressor/motor capable of operating as either a hydraulic compressor, as described with reference to FIGS. 1 and 2 above, or as a hydraulic motor, as described with reference to FIGS. 3 and 4 above. Similarly, the motor 7 of the energy storage system 2 may be a motor/generator capable of operating as a motor for driving the compressor 6, or as a generator, as described with reference to FIGS. 3 and 4.

When the energy storage device 100 is transported from a location in which the energy is stored to another location in which the energy is to be supplied, the components that are common to both the energy storage system and the energy supply system may be transported together with the energy storage device 100.

In some arrangements, a single system may be configured to perform the functions of both the energy storage system 2 and the energy supply system 300. Such systems may comprise a combined hydraulic compressor/motor and a combined motor/generator. Alternatively, such systems may comprise both a hydraulic compressor and a hydraulic motor and/or both a motor and a generator. In such arrangements, the first step 402 of the energy supply method may be omitted.

Referring to FIGS. 5, 6, 7 and 8, different arrangements of energy storage devices 500, 600, 700, 800 according to the present disclosure will now be described. Any of the energy storage devices 500, 600, 700, 800 depicted in FIGS. 5, 6, 7 and 8 may be used as the energy storage device 100 within the energy storage system 2 and energy supply system 300 described above.

Each of the energy storage devices 500, 600, 700, 800 comprises a pressure vessel 510, 610, 710, 800 having one or more walls 512, 612, 712, 812 for containing pressurised fluid stored within the pressure vessel and an inlet 514, 614, 714, 814 through which working fluid can enter and exit the pressure vessel 510, 610, 710, 810.

The pressure vessel may be substantially prism shaped, e.g. substantially cylindrical, and may define a longitudinal axis. The inlet 514, 614, 714, 814 may be arranged at one longitudinal end of the pressure vessel 510, 610, 710, 810.

In one or more arrangements, the pressure vessel 510, 610, 710, 810 has a volume of approximately 50 litres. A volume of 50 litres may provide a balance between energy storage capacity and portability of the energy storage device. In other arrangements, the pressure vessel 510, 610, 710, 810 may have any other desirable volume. Furthermore, a plurality, e.g. any number, of energy storage devices 500, 600, 700, 800 having pressure vessels of any desirable size may be operatively, e.g. fluidically, connected together in series and/or in parallel with one another in order to provide a desired energy storage capacity.

The pressure vessel 510, 610, 710, 810 further comprises one or more resilient elements 520, 620, 720, 820 arranged within and/or about the pressure vessel 510, 610, 710, 810. The resilient elements 520, 620, 720, 820 comprise a plurality of filaments of a resilient material that is twisted and/or braided, and optionally coiled, wound and/or weaved to form the resilient elements 520, 620, 720, 820.

The energy storage devices 500, 600, 700, 800 are configured such that storing pressurised fluid within the pressure vessel 510, 610, 710, 810 acts to tension or compress the associated resilient elements 520, 620, 720, 820.

Figure 5:
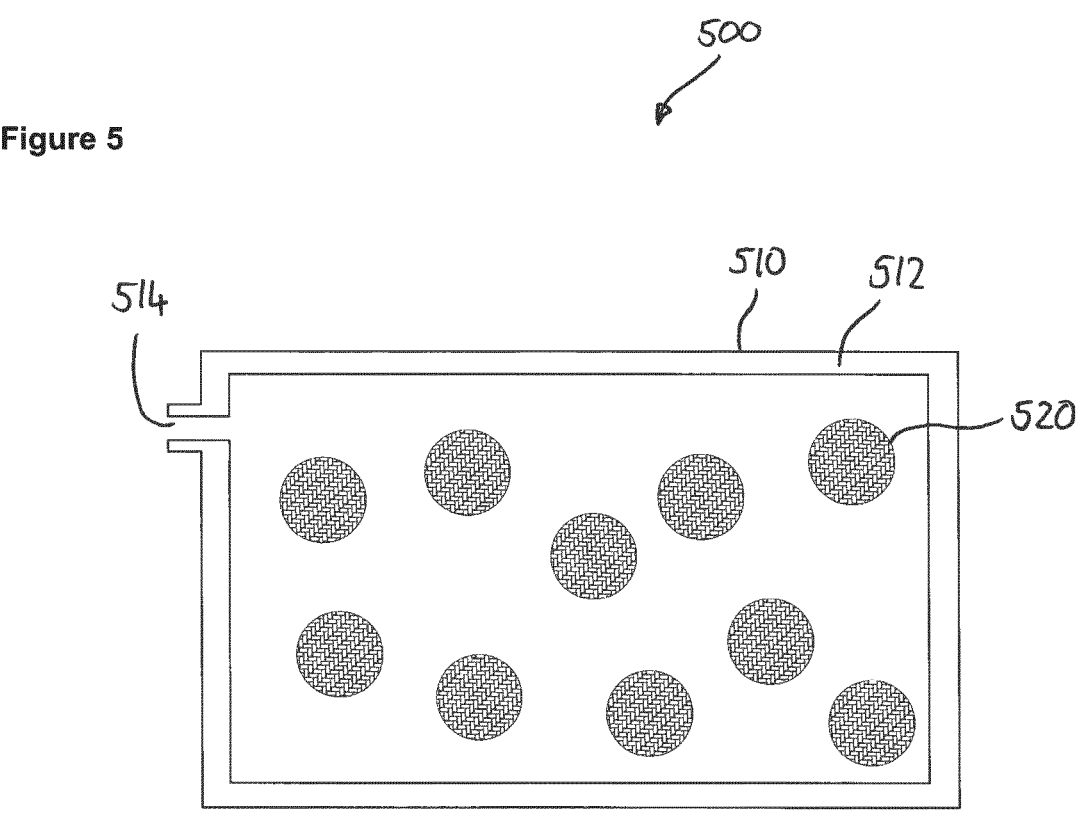
FIG. 5 is a schematic sectional view of an energy storage device for the systems shown in FIGS. 1 and 3.

In the arrangement shown in FIG. 5, the resilient elements comprise spheres 520 of resilient material that are arranged within the pressure vessel 510. Any desirable number of the resilient spheres 520 may be arranged inside of the pressure vessel 510. For example, a number of resilient sphere 520 may be arranged within the pressure vessel such that the resilient spheres take up approximately 10% of the internal volume of the pressure vessel.

The resilient spheres 520 and the walls 512 of the pressure vessel 510 are configured such that, when pressurised working fluid is stored within the pressure vessel 510, the spheres 520 are compressed. For example, a material and wall thickness of the walls 512 and a material and construction of the resilient spheres 520 may be selected when producing the energy storage device 500, such that working fluid stored within the pressure vessel at an outlet pressure of the compressor 6, causes the spheres 520 to be compressed.

Energy can thereby be stored by the energy storage device 500 as elastic potential energy relating to the compression of the resilient spheres 520. The energy storage device 500 is thereby configured to store a greater amount of energy than a pressure vessel of the same size containing working fluid pressurised to the same pressure and not containing the resilient spheres 520.

The resilient spheres 520 comprise a plurality of filaments of material that have been twisted or braided together to form ropes, which have been coiled, wound and/or woven in order to form the resilient spheres 120.

Any desirable number of filaments may be twisted or braided together in order to form the ropes of resilient material. For example, 3 or more than 3 filaments of the material may be twisted or braided to form the ropes. Furthermore, any desirable number of ropes may be coiled, wound and/or woven together, in order to form the spheres. For example, one rope may be coiled to form the sphere. Alternatively, a first rope may be coiled initially and a further rope may be coiled around the first rope to create a sphere of a larger size. Any number of further ropes may be coiled around the sphere, e.g. successively, in order to form a sphere of a desirable size. In one arrangement, 1800 fibres of material are twisted or braded together to form each rope, and 15 ropes are woven together and coiled to form each of the resilient spheres 520.

Forming the spheres from braided ropes of material increased a maximum load capacity of the spheres compared to spheres being formed of a monolithic body of the material. In use of the energy storage and energy supply systems 2, 300 described above, the spheres 520 within the energy storage device 500 are compressed and returned to a neutral compression in an alternating fashion as energy is stored and release from the energy storage device over a number of charge cycles of the energy storage device 500.

Increasing the maxing load capacity of the spheres improves the reliability of the energy storage device when subjected to multiple charge cycles. In particular, forming the spheres from the braided ropes makes the sphere more resistant to fatigue failure, since load can be distributed between filaments of the ropes that are less fatigued. Furthermore, cracks or fractures in the material of the spheres arising from fatigue of the material forming the spheres are confined to the particular strand in which the crack or fracture forms. This prevents the fatigue crack from propagating through the sphere, beyond the particular strand, further increasing the life, e.g. maximum number of charge cycles, of the resilient spheres 520.

The resilient spheres 520 may be formed from a material having a high tensile strength, e.g. high ultimate tensile strength. For example, the resilient spheres 520 may be formed from a material having an ultimate tensile strength of greater than or equal to 400 MPa. For example, the resilient spheres 520 may be formed from a high tensile strength steel, fibres of aramid or another high tensile strength polymer or metal material. In one arrangement, the resilient spheres are formed from strands of natural or synthetic spider silk.

Figure 6:
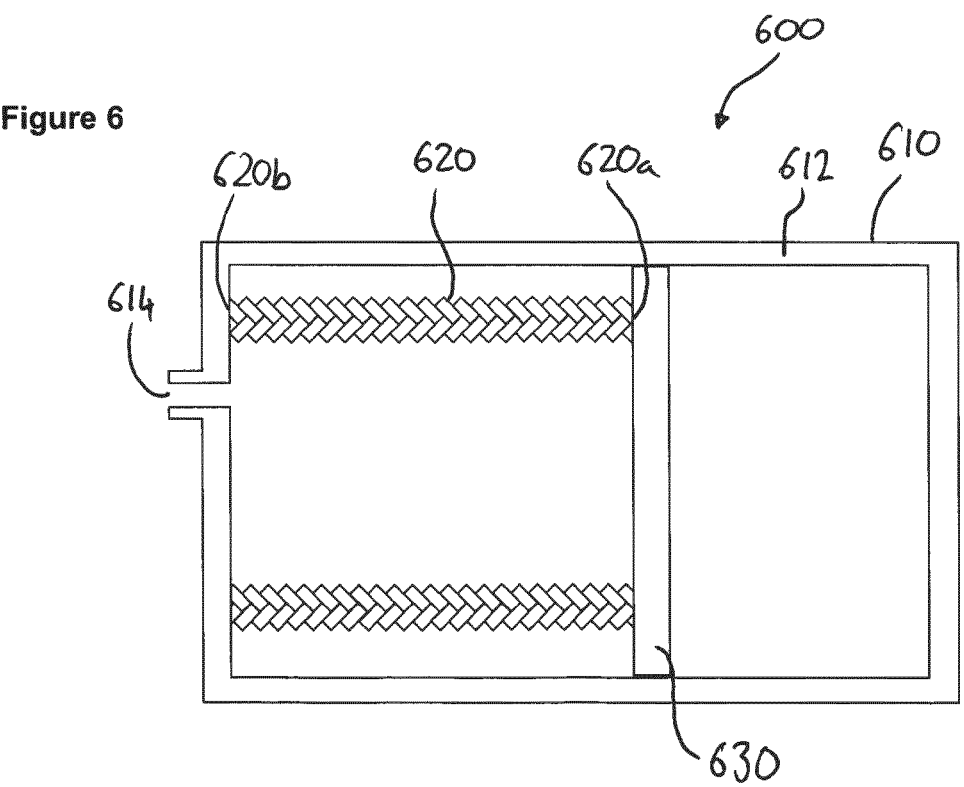
FIG. 6 is a schematic sectional view of another energy storage device for the system shown in FIGS. 1 and 3.

With reference to FIG. 6, in some arrangements, the energy storage device 600 may further comprise a piston 630 arranged within the pressure vessel 610. The piston 630 may be movably, e.g. slidably, mounted relative to the walls 612 of the pressure vessel. A seal may be formed between the piston 630 and the walls 612 of the pressure vessel, such that a volume, e.g. an operative volume, of the pressure vessel to one side of the piston is in communication with the inlet of the pressure vessel and a remaining volume of the pressure vessel to the other side of the piston is not in communication with the inlet 614 due to the presence of the piston. Movement of the piston 630 within the pressure vessel 610 away from and towards the inlet 614 of the pressure vessel thereby acts to increase and decrease the volume of the pressure vessel 610 in communication with the inlet 614.

As shown in FIG. 6, in the energy storage device 600, the resilient elements comprise elongate cables 620 coupling the piston 630 to walls 612 of the pressure vessel. In particular, first ends 620a of the cables 620 are coupled to the piston and second ends 620b are coupled to the walls 612 of the pressure vessel. The resilient cables 620 may be formed in a similar way to resilient spheres 520 described above. For example, the resilient cables 620 may be formed from 3 or more strands of resilient material that are twisted or braided together to form a rope. In some arrangements, a plurality of the ropes may be braided or woven to create the resilient cables 620. The resilient cables 620 may be formed form the same materials as the resilient spheres 520 mentioned above.

As depicted, the resilient cables are arranged such that movement of the piston 630 acting to increase the volume of the pressure vessel 610 in communication with the inlet 614 acts to tension the resilient cables 620.

The resilient cables 620 are configured such that when pressurised working fluid from the compressor 6 is introduced into the pressure vessel 610, the piston 630 is displaced away from the inlet 614, increasing the volume in which the pressurised working fluid can be stored and tensioning the resilient cables. Energy is thereby stored by the energy storage device 600 as elastic potential energy relating to the extension of the resilient cables 620, enabling the energy storage device 600 to store a greater amount of energy than a pressure vessel of the same size storing pressurised fluid the same pressure and not comprising the resilient cables 620.

In other arrangements, the resilient cables 620 may additionally or alternatively be arranged on an opposite side of the piston 630 from the inlet 614 such that when the piston 630 is displaced away from the inlet 614, the resilient elements 620 are compressed.

Figure 7:
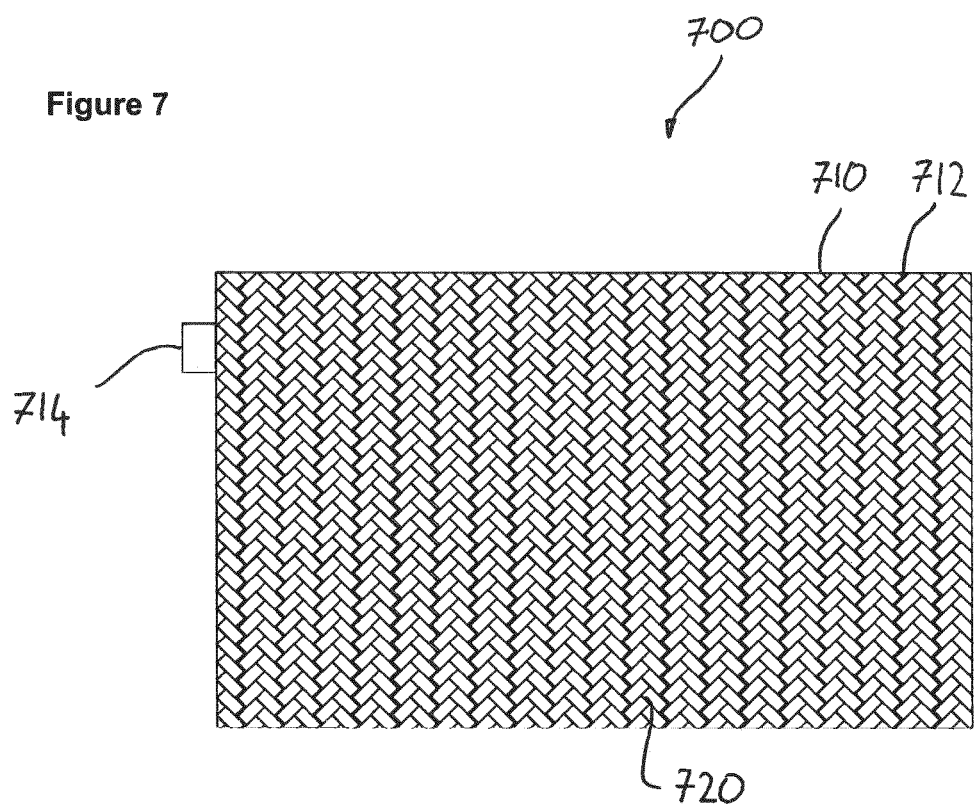
FIG. 7 is a schematic view of another energy storage device for the system shown in FIGS. 1 and 3.

FIG. 7 depicts an arrangement of the energy storage device 700 in which the resilient elements 720 are provided about the pressure vessel 710. As depicted, the resilient elements are in the form of ropes, which are wrapped around an outer surface of the pressure vessel 710. The ropes 720 may be formed in the same way as the ropes forming the spheres 520 and cables 620 described above, and may be formed from the same materials mentioned above.

The energy storage device 700 is configured such that, when pressurise working fluid from the compressor 6 is introduced into the pressure vessel 710, the walls 712 of the pressure vessel expand outwards, tensioning the resilient ropes 720 wrapping the pressure vessel.

Arranging the resilient elements outside of the pressure vessel may advantageously enable an increased volume of working fluid to be stored within a pressure vessel having a particular volume. Further, the resilient elements arranged outside of the pressure vessel are not exposed to the working fluid and may be easier to access for inspection, maintenance and repair/replacement.

In the arrangement shown in FIG. 7, the resilient ropes 720 are wound around the pressure vessel 710 to form a spiral of the resilient ropes wrapping the pressure vessel. The resilient ropes 720 therefore extend in a direction with a principle component in a direction perpendicular to the longitudinal axis of the pressure vessel, e.g. in a circumferential direction of the pressure vessel. In other arrangements the resilient ropes may be woven to form a woven arrangement of ropes wrapping the pressure vessel 710. Energy is thereby stored by the energy storage device 700 as elastic potential energy relating to the extension of the resilient ropes 720. The energy storage device 700 is therefore capable of storing a greater amount of energy than a pressure vessel of the same size storing pressurised fluid the same pressure and not being wrapped by the resilient ropes 720.

Figure 8:
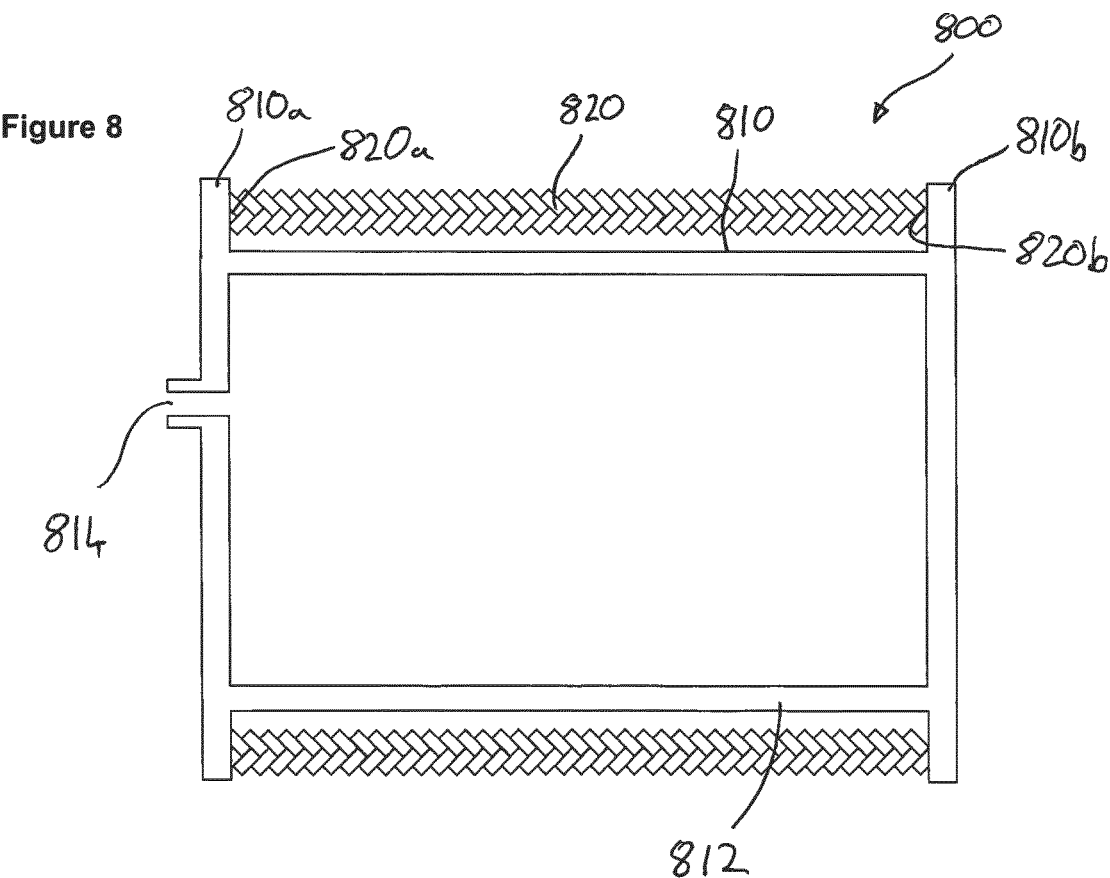
FIG. 8 is a schematic view of another energy storage device for the system shown in FIGS. 1 and 3.

In the arrangement shown in FIG. 8, the resilient elements 820 are also in the form of resilient ropes arranged about the pressure vessel 810. The resilient ropes 820 may be formed in the same way as the resilient ropes 720 and may be formed from the same materials. As depicted, the pressure vessel 810 may comprise first and second flanges 810a. 810b. The flanges may extend outwardly relative to the longitudinal axis of the pressure vessel 810. The flanges are spaced apart from one another, e.g. in the longitudinal direction of the pressure vessel. First ends 820a of the resilient ropes may be coupled to the first flange 810a and second ends 820b of the resilient ropes may be coupled to the second flange 810b.

The energy storage device 800 is configured such that, when pressurise working fluid from the compressor 6 is introduced into the pressure vessel 810, the pressure vessel expands, e.g. in the longitudinal direction, such that a distance between the first and second flanges 810*a*. 810*b* increases, tensioning the resilient ropes 820.

In FIG. 8, two resilient ropes 820 are shown. However in other arrangements, any number of resilient ropes 820 may be provided about the pressure vessel 810, e.g. spaced circumferentially about the pressure vessel.

In the arrangements described above with reference to FIGS. 5, 6, 7 and 8, each of the energy storage devices 500, 600, 700, 800 comprises a single form of resilient element. However in other arrangements, the energy storage device may comprise any combination of the resilient elements described above. In other words, the energy storage device may comprise the resilient spheres 520, the piston 630 and resilient cables 620 and/or the resilient ropes 720, 820.

For each of the arrangements described above, due to the presence of the resilient elements 520, 620, 720, 820 within and/or about the pressure vessel 510, 610, 710, a greater proportion of the working fluid stored within the pressure vessel of the energy storage device may be released from the energy storage device, e.g. during the energy supply method 400 described above, than from a pressure vessel not comprising the resilient elements. In some arrangements, such as the arrangement depicted in FIG. 6, substantially all of the working fluid may be released from the pressure vessel. For example, approximately 90% or more than 90% of the working fluid may be released.

Furthermore, due to the presence of the resilient elements 520, 620, 720 within and/or about the pressure vessel 510, 610, 710, the pressure of the working fluid may vary less during release of the working fluid then if the resilient elements were not provided, e.g. due to the resilient elements acting to maintain the pressure of the pressurised fluid as the tension or compression of the resilient elements is relaxed as the fluid is released. Accordingly, a variation in the peak power output of the energy supply system 300 may be reduced, by virtue of the present of the resilient elements.

When the pressurised fluid is released from the energy storage device, e.g. during the energy supply method 400, the pressurised fluid may be released from the pressure vessel at or below a predetermined flow rate such that a pressure of the fluid within the pressure vessel remains substantially constant whilst the majority of the fluid is release from the pressure vessel. For example, the pressure of the working fluid within the pressure vessel may vary by less than approximately 10% or 20%.

The valve 312 of the energy supply system 300 may be opened to provide a predetermine flow area, in order to control the flow rate of pressurised fluid leaving the pressure vessel.

The arrangements of the present disclosure detailed above provide a number of advantages over existing energy storage devices and systems. In particular, extracting the energy from the energy storage device using the hydraulic motor can provide a larger peak power output than existing systems, such as battery systems, depending on the size of the valve and power ratings of the hydraulic motor. Further, the hydraulic system is less susceptible to overheating when operating at high powers than existing energy storage systems and does not experience self-discharge or loss of stored energy during transport.

Arrangements of the disclosure also provide improved energy storage density compeered to existing systems and improved scalability, as any number of energy storage devices or systems can be connected in series and/or in parallel with one another to provide a desired capacity.

Furthermore, the present inventive facilitates the use of renewable energy by providing an improved system for storing and distributing energy generated from renewable sources.

In further arrangements, the energy storage system 2 and/or energy supply system 300 may be provided to store and/or supply power in other applications. For example, in some arrangements, a combined energy storage and supply system, according to the present disclosure, may be provided on a motor vehicle in order to supply power for driving the motor vehicle. Mechanical power may be supplied directly to the drive system of the motor vehicle or may be converted into electrical energy supplied to electric motors for driving the motor vehicle. The energy supply and storage system may be configured to store energy recovered during breaking of the motor vehicle, e.g. by pressurising fluid to be stored within the energy storage device 100 provided within the energy storage system on the vehicle.

It will be appreciated by those skilled in the art that although the invention has been described by way of example, with reference to one or more exemplary examples, it is not limited to the disclosed examples and that alternative examples could be constructed without departing from the scope of the invention as defined by the appended claims.

The invention claimed is:

1. An energy storage system comprising:
an energy storage device comprising:
a pressure vessel configured to store pressurized fluid; and
one or more resilient elements, wherein the resilient elements comprise a plurality of filaments of resilient material twisted and/or braided together to form the resilient elements, wherein the resilient elements are arranged within an interior of or about the pressure vessel, and wherein the energy storage device is configured such that storing pressurized fluid within the pressure vessel acts to tension or compress the resilient elements.

2. The energy storage system of claim 1, wherein the system further comprises a compressor configured to pressurize a fluid and supply the pressurized fluid to the pressure vessel.

3. The energy storage system of claim 1, wherein the energy storage system further comprises a hydraulic motor in fluidic communication with the energy storage device, wherein the energy storage system is configured such that pressurized fluid within the pressure vessel can be selectively released from the pressure vessel through the hydraulic motor in order to extract energy from the energy storage system.

4. The energy storage system of claim 1, wherein one or more of the resilient elements comprise spheres formed by winding and/or weaving the braided filaments of resilient material, wherein the spheres are arranged within the pressure vessel.

5. The energy storage system of claim 1, wherein one or more of the resilient elements are arranged about the exterior of the pressure vessel, such that expansion of the pressure vessel due to the introduction of the pressurized fluid acts to tension the resilient elements.

6. The energy storage system of claim 5, wherein the resilient elements extend around the pressure vessel in a direction with a principle component perpendicular to a longitudinal axis of the pressure vessel.

7. The energy storage system of claim 1, wherein the energy storage device further comprises a piston movably arranged within the pressure vessel such that an operative volume of the pressure vessel varies as the position of the piston within the pressure vessel varies, wherein one or more of the resilient elements are arranged such that varying the position of the piston to increase the operative volume of the pressure vessel acts to tension or compress the resilient elements.

8. The energy storage system of claim 7, wherein one or more of the resilient elements are elongate, wherein first ends of the elongate resilient elements are coupled to the piston and second ends of the elongate resilient elements are coupled to a wall of the pressure vessel.

9. The energy storage system of claim 1, wherein the resilient material has a tensile strength of greater than 400 MPa.

10. The energy storage system of claim 1, wherein the resilient material comprises a natural or synthetic spider silk.

11. An energy storage method comprising:
providing an energy storage device, the energy storage device comprising:
a pressure vessel configured to store pressurized fluid; and
one or more resilient elements, wherein the resilient elements comprise a plurality of filaments of resilient material twisted and/or braided together to form the resilient elements, wherein the resilient elements are arranged within an interior of or about the pressure vessel, and wherein the energy storage system is configured such that storing pressurized fluid within the pressure vessel acts to tension or compress the resilient elements; and
introducing pressurized fluid into the pressure vessel.

12. The energy storage method of claim 11, wherein the method further comprises:
transporting the energy storage device to a location at which energy is to be supplied.

13. The energy storage method of claim 11, wherein the method further comprises:
operatively coupling the pressure vessel to a hydraulic motor; and
releasing the pressurized fluid through the hydraulic motor in order to convert stored energy to mechanical or electrical energy.

14. An energy supply method comprising:
providing an energy storage device, the energy storage device comprising:
pressure vessel containing a pressurized fluid; and
one or more resilient elements, wherein the resilient elements comprise a plurality of filaments of resilient material twisted and/or braided together to form the resilient elements, wherein the resilient elements are arranged within an interior of or about the pressure vessel, and wherein the energy storage device is configured such that the resilient elements are placed in tension or compression by virtue of the pressured fluid being present within the pressure vessel; and
releasing the pressurized fluid from the pressure vessel through a hydraulic motor in order to generate mechanical or electrical energy.

15. The method of claim 14, wherein the pressurized fluid is released from the pressure vessel at or below a flow rate, the flow rate such that a pressure of the fluid within the pressure vessel remains substantially constant whilst the majority of the fluid is released from the pressure vessel.

* * * * *